United States Patent [19]
Sakoda et al.

[11] Patent Number: 5,092,734
[45] Date of Patent: Mar. 3, 1992

[54] FILTER FEEDER

[75] Inventors: Yutaka Sakoda; Michihiro Kanamura, both of Hiroshima, Japan

[73] Assignee: Mazda Motor Corporation, Hiroshima, Japan

[21] Appl. No.: 524,053

[22] Filed: May 16, 1990

[30] Foreign Application Priority Data

May 19, 1989 [JP] Japan .............................. 1-58575[U]

[51] Int. Cl.[5] .............................................. B65G 59/06
[52] U.S. Cl. ..................................... 414/798; 221/132;
221/290; 221/298; 414/222; 414/226; 414/728;
414/739
[58] Field of Search ................ 221/22, 132, 290, 297,
221/298, 301; 414/222, 223, 225, 226, 728, 739,
731, 798

[56] References Cited

U.S. PATENT DOCUMENTS

| | | | |
|---|---|---|---|
| 1,150,240 | 8/1915 | Avery | 221/290 |
| 2,954,900 | 10/1960 | Brubaker | 221/297 X |
| 3,178,040 | 4/1965 | Nelson | 414/728 |
| 4,456,148 | 6/1984 | Newman et al. | 221/132 |
| 4,507,039 | 3/1985 | Sawa et al. | 221/297 X |

Primary Examiner—David A. Bucci
Assistant Examiner—Janice Krizek
Attorney, Agent, or Firm—Wenderoth, Lind & Ponack

[57] ABSTRACT

A filter feeder for automatically feeding filters one by one to casting molds traveling in a mold transfer line includes a rotatably arranged table and a plurality of cartridges vertically arranged on the table. Each of the cartridges accommodates a plurality of filters placed one upon another. A filter discharge mechanism is provided at a lower end of each cartridge to discharge a lowermost filter of the filters accommodated in the cartridge. The filter discharge mechanism includes a pair of shutter plates pivotally mounted on the lower end of the cartridge so that the lowermost filter may be discharged from the filter discharge mechanism when the shutter plates are opened. The filter feeder is further provided with a receiving mechanism for receiving the filter discharged from the filter discharge mechanism at a first location below the cartridge. The receiving mechanism is capable of pivoting between the first location and a second location from which the filter discharged from the filter discharge mechanism is transferred towards one of the casting molds. The shutter plates are opened in association with the pivotal movement of the receiving mechanism to the first location.

8 Claims, 7 Drawing Sheets

FILTER FEEDER

BACKGROUND OF THE INVENTION

1. Field of the Invention

The present invention generally relates to a filter feeder for feeding filters for casting use, and more particularly, to a filter feeder for automatically feeding filters accommodated in a plurality of cartridges one by one to a certain external location at which each of the filters is set in a casting mold.

2. Description of the Prior Art

When a molten metal is introduced into a casting mold, a porous ceramic filter for casting use is often mounted on a gate of the mold to remove slag or the like produced on the surface of the molten metal.

Since this filter is easily damaged, it is difficult to bring into practical use an automatic filter feeder for automatically feeding filters one by one to a plurality of molds.

Conventionally, a filter is generally manually fed to and mounted on a mold at a filter mounting station in a casting line. Such work causes a relatively high cost of manufacture. To avoid this, it is possible to employ an assembling robot. However, since the work is relatively simple, the provision of an assembling robot exclusively for such use is not economical.

It is considered to employ an automatic filter feeder provided with a plurality of removable cylindrical cartridges each accommodating a number of filters for casting use placed one upon another. The automatic filter feeder is provided at a filter mounting station in a casting line and automatically feeds filters one by one from the cartridges at a location appropriate for feeding the filters.

However, each of the filters taken out from the lower end of each cartridge must be moved a predetermined distance and positioned in a predetermined posture. Thereafter, the filter must be held by a suitable means and transferred to the filter mounting station in the casting line, at which the filter is mounted on the mold. Accordingly, the automatic filter feeder becomes complicated in construction and the cost of equipment becomes high.

SUMMARY OF THE INVENTION

It is accordingly an object of the present invention to provide a filter feeder overcoming the above-enumerated disadvantages.

Another object of the present invention is to provide a filter feeder which is simple in construction and stable in operation, and can effectively feed filters for casting use one by one.

In order to accomplish these and other objects, the filter feeder according to the present invention is provided with at least one vertically arranged cartridge accommodating a plurality of filters placed one upon another and filter discharge means, disposed at a lower end of the cartridge, for discharging a lowermost filter of the filters accommodated in the cartridge. The filter discharge means includes shutter means pivotally mounted on the lower end of the cartridge so that the lowermost filter may be discharged from the filter discharge means when the shutter means is opened.

The filter feeder is further provided with receiving means for receiving the filter discharged from the filter discharge means at a first location below the cartridge. The receiving means is capable of pivoting between the first location and a second location from which the filter discharged from the filter discharge means is transferred towards one of casting molds. The shutter means is opened in association with a pivotal movement of the receiving means to the first location.

The filter discharged from the filter discharge means is properly positioned in the receiving means, when the receiving means pivots from the first location to the second location.

The filter feeder is further provided with clamp means for clamping at the second location the filter received by the receiving means in order to transfer the filter towards one of the casting molds and detector means for detecting whether or not the filter must be set in a casting mold.

In another aspect of the present invention, a plurality of cartridges each accommodating a plurality of filters placed one upon another are vertically arranged on a rotatably arranged table.

In the filter feeder according to the present invention, when each of filters for casting use is fed from a cartridge, the receiving means is located below the cartridge. In this event, the shutter means is opened by the receiving means so that the filter may be discharged from the cartridge and received by the receiving means. Thereafter, the receiving means is caused to pivot and shifted to the second location appropriate to feed the filter towards a casting mold. During this pivotal movement, the filter is properly positioned in the receiving means. The filter is then clamped by the clamp means and transferred towards the casting mold.

Since the shutter means is opened by the receiving means, the shutter means can be simplified in construction. In addition, the function of the receiving means is diversified because the receiving of the filter, the shift thereof to the second location, and the positioning thereof in the receiving means are successively effectively performed through the pivotal movement of the receiving means. Accordingly, means for performing the operations from the receiving of the filter to the positioning thereof can be remarkably simplified and the operating efficiency becomes high.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
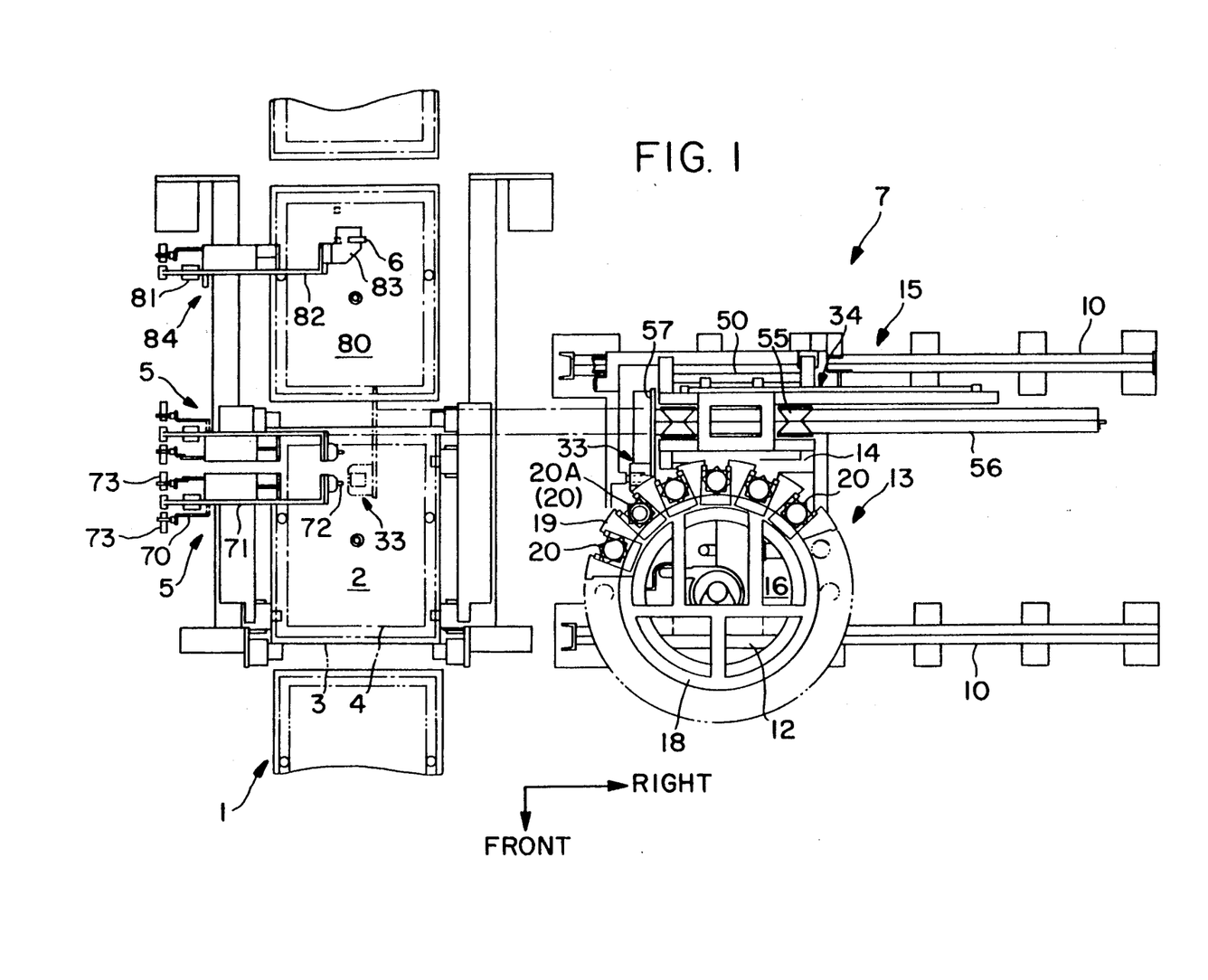
FIG. 1 is a top plan view of a filter feeder according to the present invention and a mold transfer line.
Figure 2:
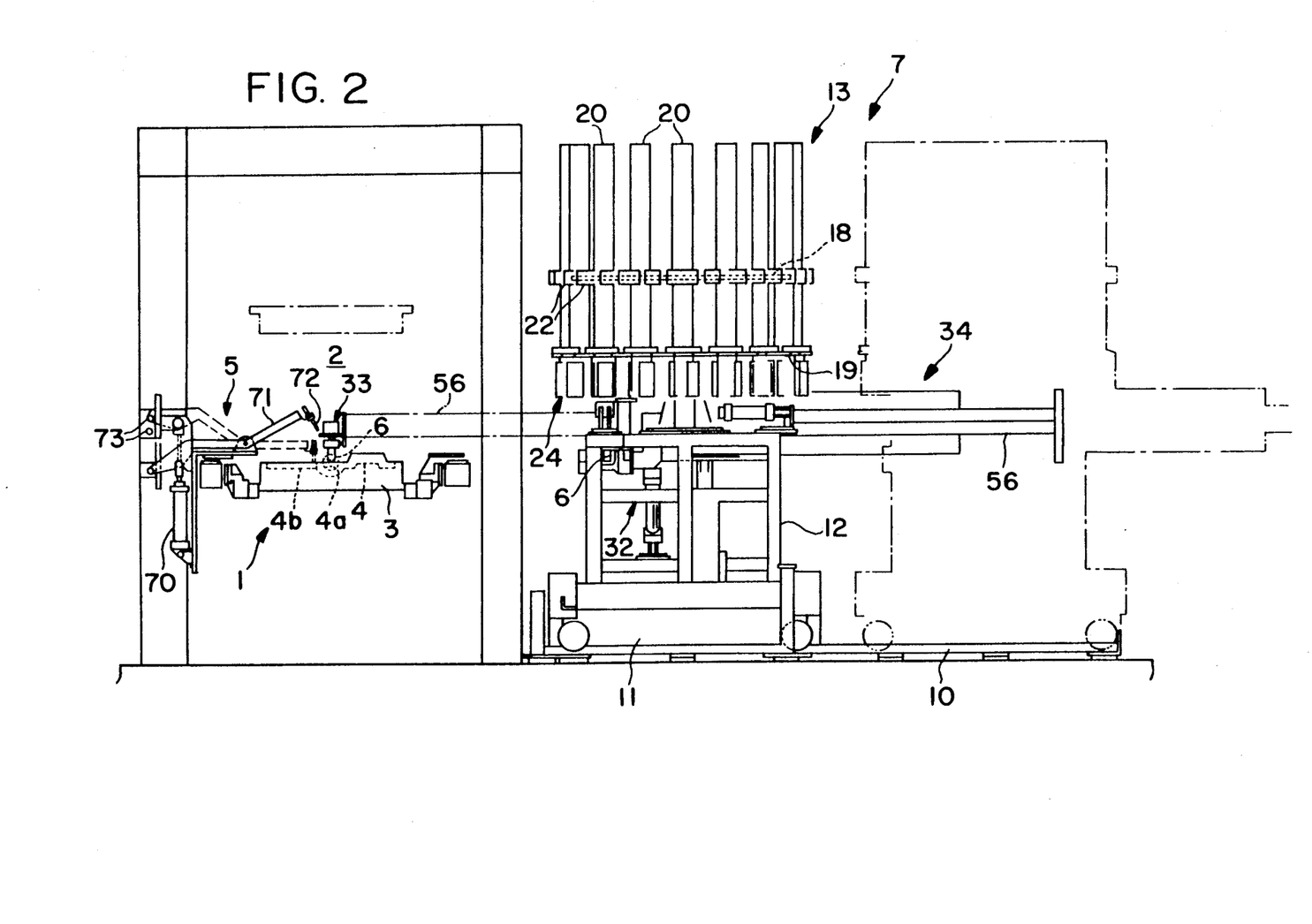
FIG. 2 is a front elevational view of the filter feeder of FIG. 1.

Referring now to the drawings, there is shown in FIGS. 1 and 2 a filter feeder 7 according to the present invention, which automatically sets each of filters for casting use at a predetermined location of a shell mold formed on a back metal. The filters are made of porous ceramic material, and each of them is formed substantially in the shape of a disc and can filter molten material to be poured into the mold.

As shown in FIGS. 1 and 2, a mold transfer line 1 includes a filter mounting station 2, to which a back metal 3 having a shell mold 4 formed on the surface thereof is transported. A pair of detector sets 5 disposed in the vicinity of the filter mounting station 2 detect whether or not a filter 6 should be set on the shell mold 4. If the filter 6 is required to be set, the filter feeder 7 disposed on the side opposite to the detector sets 5 with respect to the filter mounting station 2 sets the filter 6 in a recess 4a formed at a gate of the shell mold 4.

The filter feeder 7 comprises a transfer table 11 freely movable along a pair of guide rails 10 spaced in parallel relationship with each other, a storage mechanism 13 for storing a number of filters 6, and a feed mechanism 15 for taking out in order the filters 6 stored in the storage mechanism 13 and for setting each of them in a recess 4a. The storage mechanism 13 and the feed mechanism 15 are mounted on a front frame 12 and a rear frame 14 of the transfer table 11, respectively. The transfer table 11 can move between a leftmost position, as shown by solid lines in FIG. 2, at which each of the filters 6 is fed to a recess 4a and a rightmost position, as shown by phantom lines in FIG. 2, at which filters can be replenished to the filter feeder 7 when all the filters 6 stored in the storage mechanism 13 are used up.

The storage mechanism 13 is provided with a vertically extending rotary shaft 16 substantially at the center of the front frame 12 and a pair of annularly formed upper and lower support frames 18 and 19 securely mounted on an intermediate portion and a lower end portion of the rotary shaft 16, respectively. A plurality of regularly spaced cylindrical cartridges 20, in each of which are accommodated a number of filters 6 one upon another, are detachably mounted on the periphery of the support frames 18 and 19. The filters 6 are fed downwards one by one from a cartridge 20A located at a filter feed position of a left-hand rear portion of the front frame 12, as viewed in FIG. 1. When the filters 6 accommodated in this cartridge 20A are all used up, the support frames 18 and 19 along with all the cartridges 20 are rotated counterclockwise by a predetermined pitch by a drive mechanism (not shown) so that a cartridge 20 next to the cartridge 20A reaches the filter feed position.

Figures 3, 4, 5:
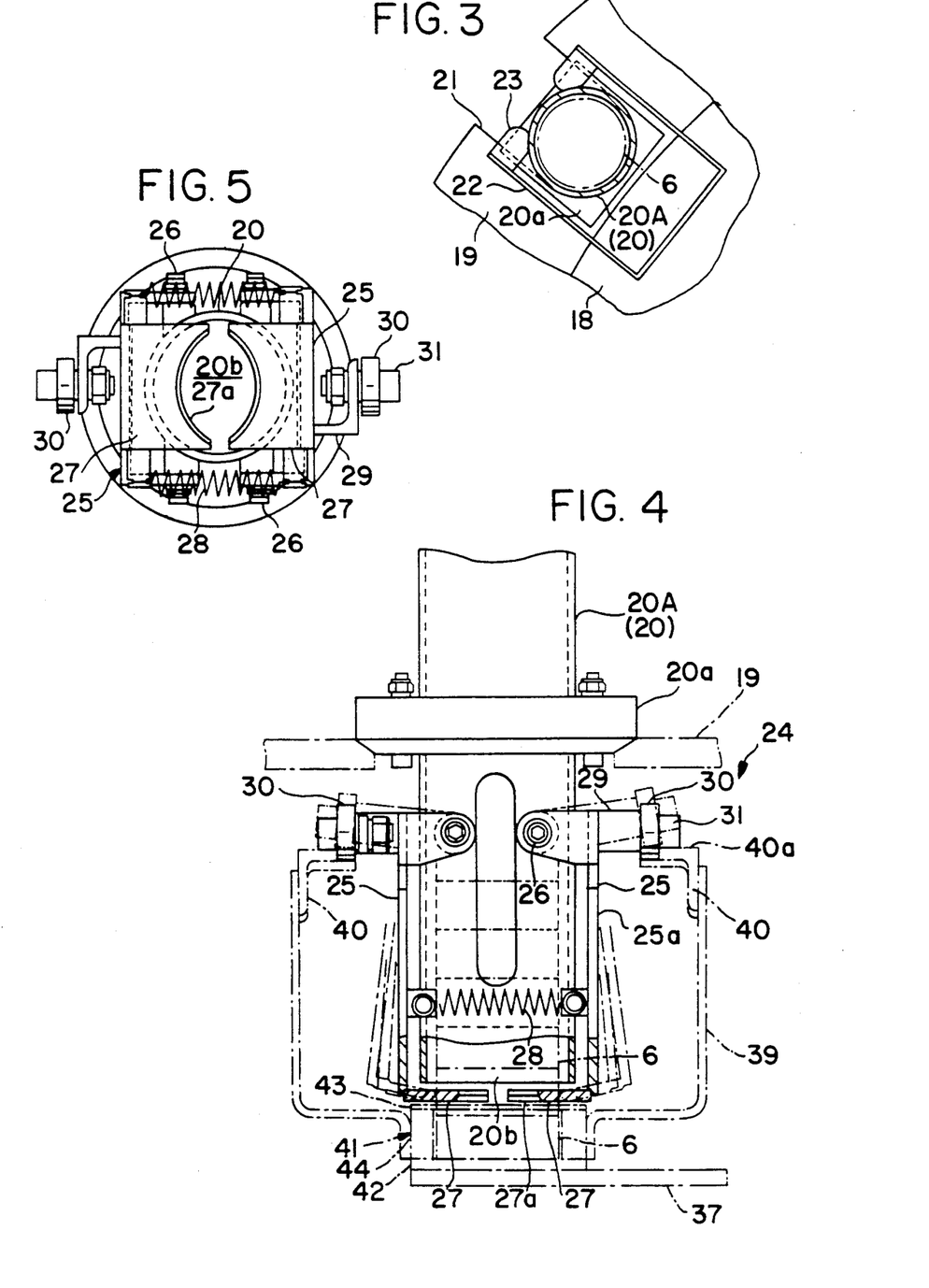
FIG. 3 is a top plan view of part of a storage mechanism provided in the filter feeder of FIG. 1.
FIG. 4 is a front elevational view of the lower end of a cartridge provided in the filter feeder of FIG. 1.
FIG. 5 is a bottom plan view of the cartridge of FIG. 4.

As shown in FIG. 3, a plurality of recesses 21 are formed along the periphery of the lower support frame 19 and spaced from one another at regular intervals. A plurality of outwardly extending resilient members 22 substantially in the form of a figure "U" are securely mounted on the upper support frame 18 along the periphery thereof and spaced from one another at regular intervals. Two inwardly protruding stoppers 23 are formed on opposite ends of each resilient member 22 so as to be opposed to each other. Each cartridge 20 is provided with an outwardly extending flange 20a at a location in the vicinity of the lower end thereof. When each cartridge 20 is introduced into one of the recesses 21 in a manner in which the flange 20a is supported by the lower support frame 19, the cartridge 20 is held inside the resilient member 22 by the stoppers 23. Accordingly, the cartridge can be mounted on or dismounted from the upper and lower support frames 18 and 19 in a direction radially of the rotary shaft 16.

In order to feed the filters 6 downwards, a filter discharge mechanism 24 having the following construction is provided on the lower end of each cartridge 20.

As shown in FIGS. 4 and 5, a pair of tilt plates 25 are disposed in the vicinity of the lower end of each cartridge 20 and can pivot about horizontally extending respective pivot shafts 26. Each tilt plate 25 is formed substantially in the shape of a figure "U", as viewed from above, and is provided with a downwardly extending arm 25a integrally formed therewith. A pair of flat shutter plates 27 for opening and closing an opening 20b of the cartridge 20 are rigidly secured to the lower ends of respective arms 25a. Both the arms 25a are biased inwards by two compression coil springs 28, each of which is stretched between intermediate portions of respective arms 25a. The shutter plates 27 are pivotally supported by respective pivot shafts 26 via the arms 25a so as to be movable between a closed position as shown by solid lines in FIG. 4 and an open position as shown by double-dotted chain lines. The shutter plates 27 are normally held at the closed position by the coil springs 28 to prevent the filters 6 from dropping.

An outwardly extending L-shaped support member 29 is rigidly secured to an upper portion of each tilt plate 25. A roller 30 is disposed outside of each support member 29 and can rotate about a shaft 31 extending in a direction perpendicular to the pivot shaft 26. The roller 30 is brought into contact with an operating face 40a of an operating member 40, which will be later described, when the shutter plates 27 are opened. The paired shutter plates 27 have respective arc-shaped inner ends 27a for clamping the filters 6 one at a time.

In the filter discharge mechanism 24 of the cartridge 20A located at the filter feed position, when both the rollers 30 are pushed up by the operating members 40, the shutter plates 27 are moved to open the opening 20b of the cartridge 20A so that the lowermost one of filters 6 accommodated in the cartridge 20A may pass through the shutter plates 27 and be received by a receiving tool 41, which will be later discussed. In this event, the next filter 6 is located between both the shutter plates 27. When the operating members 40 leave the rollers 30, this next filter 6 is clamped by the inner ends 27a of the shutter plates 27 under the influence of the biasing force of the coil springs 28. In FIG. 4, single-dotted chain lines represent such conditions. In this way, the operating members 40 and the coil springs 28 cause the shutter plates 27 to be located in either an open position at which the opening 20b of the cartridge 20A is opened or a clamp position at which the lowermost filter 6 in the cartridge 20A is clamped by the shutter plates 27. As a result, the filters 6 accommodated in the cartridge 20A are received one by one by the receiving tool 41.

As shown in FIGS. 6 to 9, the feed mechanism 15 receives each filter 6 from the cartridge 20A and sets it in the recess 4a formed in the shell mold 4. The feed mechanism 15 comprises a receiving mechanism 32, a clamp device 33, a transfer mechanism 34, and a tilting mechanism 48. The receiving mechanism 32 receives each of the filters 6 at a receiving position by the operation of the filter discharge mechanism 24 and shifts it to a feed position located below the receiving position through pivotal movement of the receiving mechanism 32. The clamp device 33 clamps the filter 6 shifted to the feed position. The transfer mechanism 34 transfers the filter 6 clamped by the clamp device 33 to a location above the recess 4a. The tilting mechanism 48 can tilt the clamp device 33 along with the transfer mechanism 34 between a clamp position at which the clamp device 33 can clamp the filter 6 and a retracted position above the clamp position. The clamp device 33, the transfer mechanism 34, and the tilting mechanism 48 constitute feed means.

Figure 7:
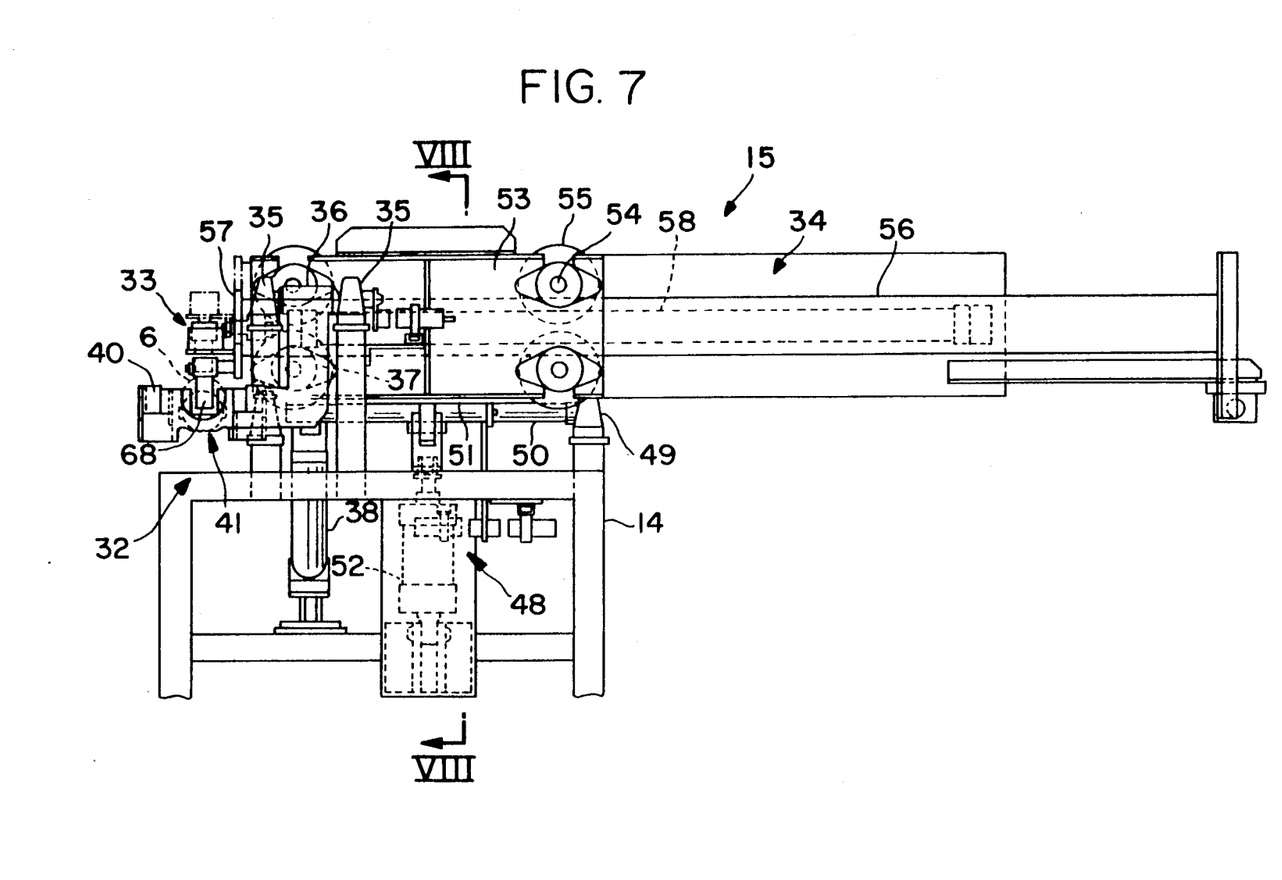
FIG. 7 is a front elevational view of the feed mechanism of FIG. 6.

In the receiving mechanism 32, a shaft 36 extending in the direction of travel of the filter feeder 7 is rotatably supported by a pair of brackets 35, which are fixedly mounted on the front upper portion of the rear frame 14. An L-shaped tilt arm 37, extending downwards as viewed in FIG. 7, is fixed to the shaft 36 and can pivot along with the shaft 36, by the operation of a drive cylinder 38, between the receiving position located below the cartridge 20A as shown by phantom lines in FIG. 8 and the feed position as shown by solid lines in FIG. 8, which is deviated downwards from the receiving position by approximately 90°.

Figure 6:
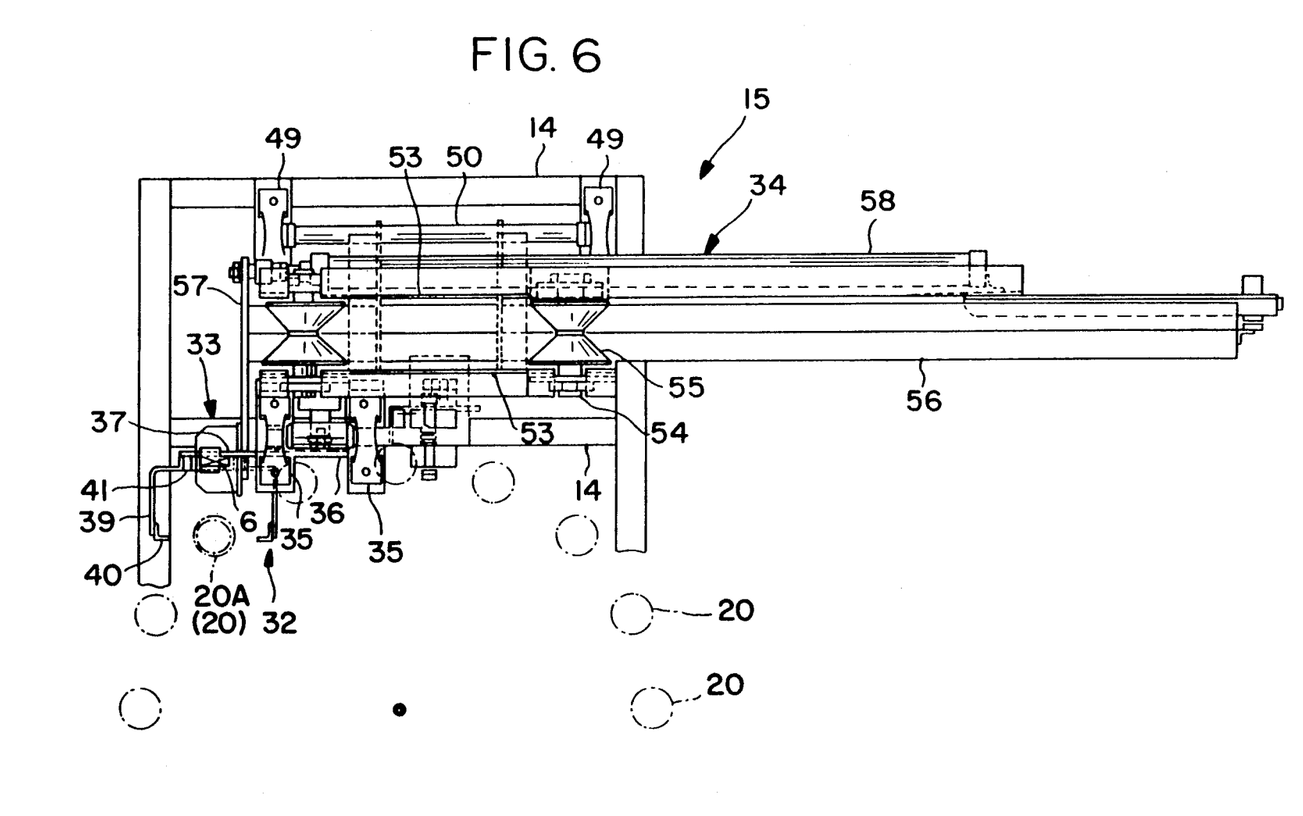
FIG. 6 is a top plan view of a feed mechanism provided in the filter feeder of FIG. 1.

As shown in FIG. 6, receiving tool 41 for receiving the filter 6 fed from the cartridge 20A is fixedly mounted on one end of the tilt arm 37. A pair of L-shaped arm members 39 extending frontwards as viewed in FIG. 6 are rigidly secured at respective ends thereof to opposite sides of the receiving tool 41. An L-shaped operating member 40 is rigidly secured to the other end of each arm member 39. The two operating members 40 extend inwards so as to be opposed to each other and are provided with respective operating faces 40a, which are brought into contact with the rollers 30 and push them upwards when the operating members 40 are turned to the receiving position.

Figure 9:
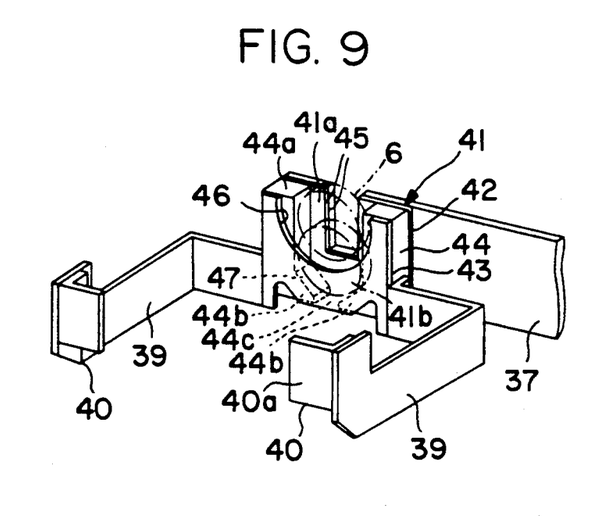
FIG. 9 is a perspective view of a receiving tool provided in the filter feeder of FIG. 1.

As shown in FIG. 9, the receiving tool 41 comprises a flat receiving plate 42, a cover plate 43, and a positioning block 44 interposed between both the plates 42 and 43 and having a thickness slightly greater than that of the filter 6. Each of the receiving plate 42 and the tilt arm 37 has a rectangular opening 45 formed in an upper portion thereof, through which a clamp arm 68 of the clamp device 33 can pass. On the other hand, the cover plate 43 has a semicircular opening 46 formed in an upper portion thereof, through which both the filter 6 and the clamp arm 68 can pass. The positioning block 44 consists of a pair of guide members 44a having respective projections 44b at lower inner portions thereof as viewed in FIG. 9. Both the projections 44b have respective inwardly inclined surfaces 47 and are spaced from each other at a certain space 44c, through which fine powder issuing from the filter 6 or the like is discharged. A first recess 41a for receiving the filter 6 is defined by both the guide plates 44a and the receiving plate 42 at an upper half portion of the receiving tool 41 whereas a second recess 41b for receiving the filter 6 is defined by both the guide plates 44a, both the projections 44b, and both the plates 42 and 43 at a lower half portion of the receiving tool 41.

When the tilt arm 37 is turned to reach the receiving position, the rollers 30 are pushed upwards by the operating faces 40a of the operating members 40. In this event, the lowermost filter 6 accommodated in the cartridge 20A is placed, through the opening 46, on the receiving plate 42 in the first recess 41a, as shown by double-dotted chain lines in FIG. 9. When the tilt arm 37 is further turned to reach the feed position, the filter 6 accommodated in the first recess 41a moves downwards on the receiving plate 42, as shown by single-dotted chain lines, so that the filter 6 is held in the second recess 41b by both the plates 42 and 43 and both the inclined surfaces 47.

Figure 8:
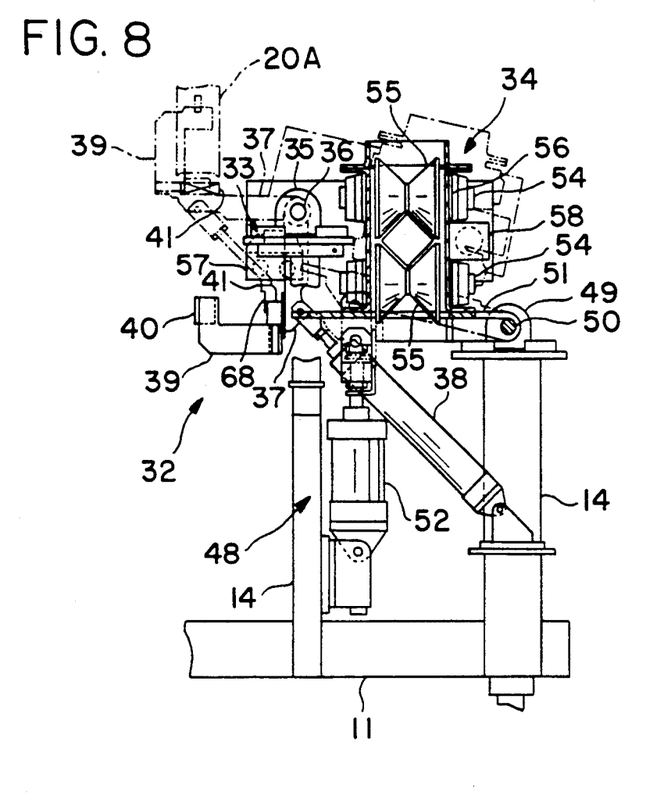
FIG. 8 is a sectional view taken along line VIII—VIII in FIG. 7.

The tilting mechanism 48 can tilt the clamp device 33 along with the transfer mechanism 34 and causes them to be located in either the clamp position or the retracted position above the clamp position. As shown in FIGS. 6 and 8, a shaft 50 extending in the direction of travel of the filter feeder 7 is rotatably journaled in a pair of bearings 49 rigidly secured to the upper rear portion of the rear frame 14. A base plate 51 extending frontwards is rigidly secured to the shaft 50 and can tilt, by the operation of a cylinder 52 vertically disposed substantially at the center of the front portion of the rear frame 14, between the clamp position as shown by solid lines in FIG. 8 and the retracted position as shown by phantom lines, thereby positioning the clamp device 33 at either the position as shown by solid lines in FIG. 7 at which the clamp device 33 can clamp the filter 6 transferred to the feed position or the retracted position as shown by phantom lines in FIG. 7.

The transfer mechanism 34 is provided for transferring the filter 6 clamped by the clamp device 33 to a location above the recess 4a. As shown in FIGS. 1, 2, and 6 to 8, a pair of spaced support plates 53 are securely mounted on the base plate 51 and extend in the direction of travel of the filter feeder 7. Two sets of upper and lower guide rollers 55 are rotatably mounted on respective shafts 54 extending across opposite ends of the support plates 53. A support bar 56 for accommodating an air hose connected to the clamp device 33 or the like is reciprocably mounted between upper and lower guide rollers 55. A support plate 57, on which the clamp device 33 is fixedly mounted, is secured to the left end of the support bar 56, as viewed in FIG. 6. A transfer cylinder 58 is disposed along the support bar 56 to move the clamp device 33 between a stored position as shown by solid lines in FIG. 1 and an extended position as shown by phantom lines.

Figure 10:
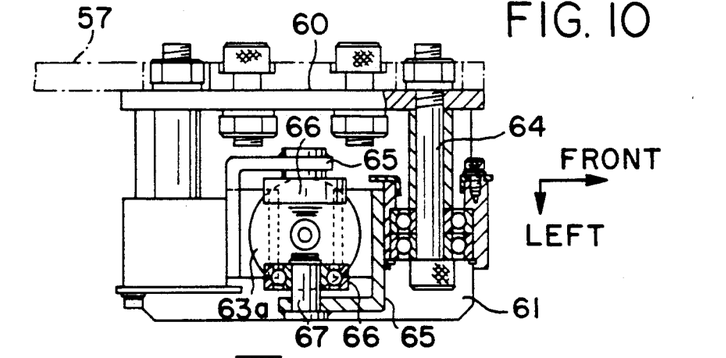
FIG. 10 is a top plan view, partially in section, of a clamp device provided in the filter feeder of FIG. 1.
Figures 11, 12:
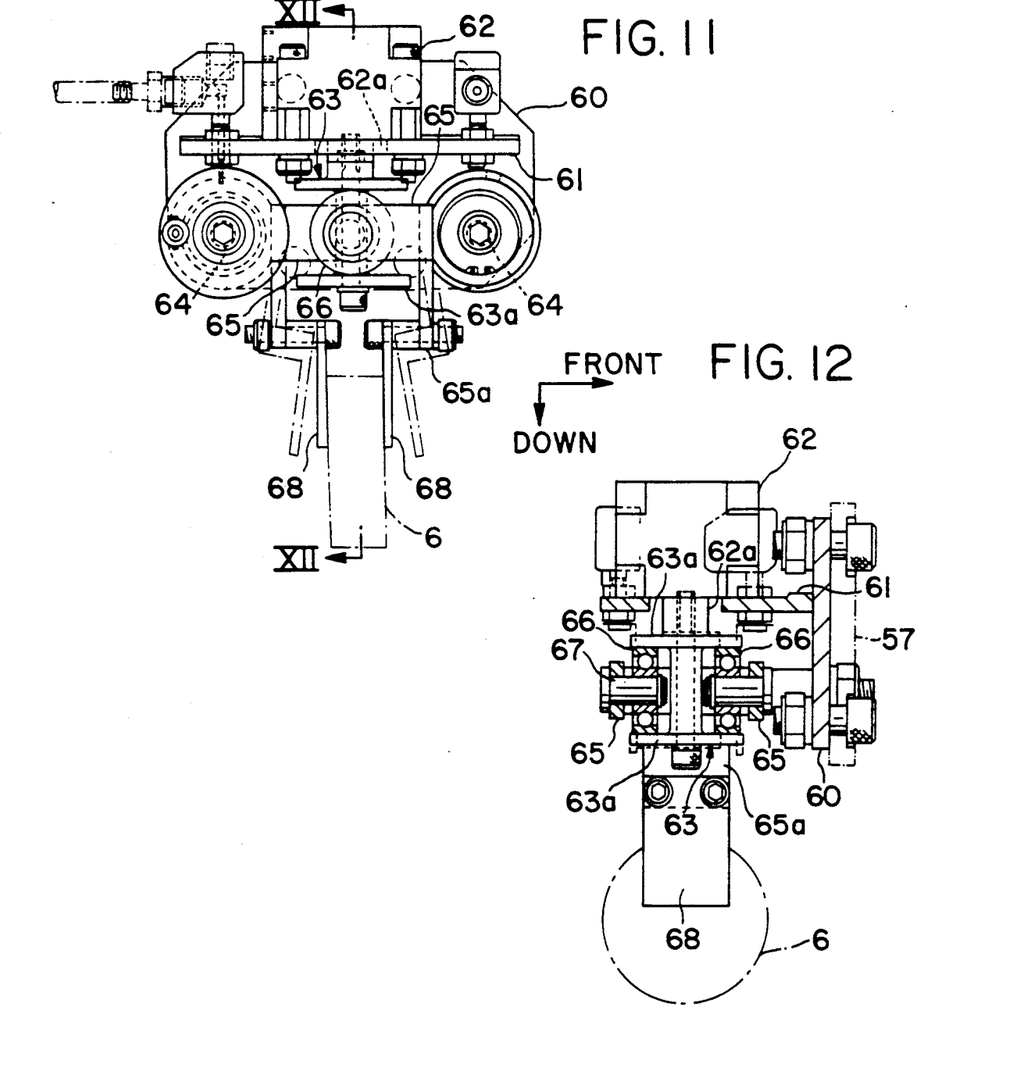
FIG. 11 is a side elevational view of the clamp device of FIG. 10.
FIG. 12 is a sectional view taken along line XII—XII in FIG. 11.

As shown in FIGS. 10 to 12 illustrating the clamp device 33, a base plate 60 is securely mounted on the support plate 57 on the left side surface of the front end thereof. A clamp cylinder 62 is securely mounted on the upper surface of a horizontally extending support plate 61 substantially at the center thereof, which is fixed to an intermediate portion of the base plate 60. The clamp cylinder 62 is provided with a downwardly extending piston rod 62a, on which an operating member 63 having a pair of upper and lower operating discs 63a is mounted.

A pair of support rods 64 are securely mounted on the base plate 60 at the lower portion thereof and extend leftwards therefrom. An inwardly extending arm 65 is pivotally mounted on a left end portion of each support rod 64 and a roller 66 interposed between both the operating discs 63a is rotatably mounted on an inner end of each arm 65 via a shaft 67 extending in the direction perpendicular to the base plate 60. The arms 65 have respective support portions 65a extending downwards therefrom and a pair of opposed clamp arms 68 for clamping the filter 6 are securely mounted on lower ends of these support portions 65a. The clamp arms 68 are driven by the clamp cylinder 62 so as to be pivotable between a clamp position as shown by solid lines in FIG. 11 and an open position as shown by phantom lines.

It is to be noted here that some shell molds 4 require the filter 6 and some require no filter in a mold transfer line 1. In order to distinguish the necessity of a filter 6, the pair of detector sets 5 are provided on the left side of the filter mounting station 2 as viewed in FIG. 1. During molding, an identification recess 4b indicative of the necessity of the filter 6 is formed in advance in each of the shell molds 4 which require the filter 6.

As shown in FIGS. 1 and 2, each of the detector sets 5 comprises a cylinder 70 disposed vertically on the left side of the filter mounting station 2, a tilt arm 71 operated by the cylinder 70, a detector rod 72 mounted on one end of the tilt arm 71 so as to be brought into contact with the inner surface of the identification recess 4b, and a pair of upper and lower sensors 73 for detecting whether or not the filter 6 must be set based upon the height of the other end of the tilt arm 71. The presence or absence of the identification recess 4b is detected by detecting the height of the other end of the tilt arm 71. The tilt arm 71 can move between a retracted position as shown by solid lines in FIG. 2 and a detecting position as shown by phantom lines.

As shown in FIG. 1, a cleaning station 80 for cleaning the shell molds 4 is disposed downstream from the filter mounting station 2. During cleaning, air is blown against the surface of the shell molds 4. A filter biasing mechanism 84 is provided on the left side of the cleaning station 80 to prevent each filter 6 from being shifted. The filter biasing mechanism 84 comprises a vertically arranged cylinder 81, a tilt arm 82 operated by the cylinder 81, and a spring member 83 in the form of a flat plate, securely mounted on one end of the tilt arm 82, for depressing the filter 6.

The filter feeder 7 having the above described construction operates as follows.

When a shell mold 4 which requires the filter 6 is transferred into the filter mounting station 2, the drive cylinder 38 turns the tilt arm 37 to the receiving position. The rollers 30 are pushed upwards by the operating faces 40a of the operating members 40, thereby opening the shutter plates 27. Accordingly, the lowermost one of filters accommodated in the cartridge 20A passes through the opening 46 and is placed on the receiving plate 42 of the first recess 41a. In this event, the next filter 6 reaches a location between both the shutter plates 27.

Thereafter, the tilt arm 37 is turned to the feed position and the operating members 40 leave the rollers 30 so that the next filter 6 may be held between the inner ends 27a of the shutter plates 27. The filter 6 accommodated in the first recess 41a moves downwards along the receiving plate 42 and is positioned by both the plates 42 and 43 and both the inclined surfaces 47 of the positioning blocks 44. In this way, the filter 6 is held in the second recess 41b.

The tilting mechanism 48 then turns the clamp device 33 to the clamp position and the clamp arms 68 of the clamp device 33 are moved to be located before and behind the filter 6. In this event, the clamp cylinder 62 is actuated so that the filter 6 may be clamped by the clamp arms 68.

Thereafter, the clamp device 33 is turned to the retracted position and the filter 6 is taken out from the receiving tool 41. The filter 6 is then transferred to a location above the shell mold 4 by the transfer cylinder 58 and the clamp device 33 is further turned to a mounting position at which the filter 6 is mounted in the recess 4a of the shell mold 4.

After the mounting of the filter 6, the clamp device 33 is turned to the retracted position by the tilting mechanism 48 and transferred to the stored position by the transfer cylinder 58. Filters 6 accommodated in the cartridge 20A are successively set in the recesses 4a of the shell molds 4 to be transferred into the filter mounting station 2 by repeating the above operations.

On the other hand, when all the filters 6 accommodated in the cartridge 20A are used up, all the cartridges 20 along with the support frames 18 and 19 are rotated about the rotary shaft 16 so that a cartridge 20 next to the cartridge 20A will reach the feed position.

As described above, according to the present invention, the operations for receiving the filters 6 from the cartridge 20A one by one by operating the filter discharge mechanism 24, the operations for transferring the received filters 6 to the feed position, and the operations for positioning each filter 6 transferred to the feed position at a predetermined location can be performed using the receiving mechanism 32 having such a simple construction that the operating members 40 and the receiving tool 41 merely move between the receiving position and the feed position.

Furthermore, the filter feeder 7 according to the present invention can automatically feed ceramic filters 6 which are relatively easily damaged by an impact or the like. Conventionally, it was difficult to automatically feed such filters 6. In the filter feeder 7 according to the present invention, however, the filters 6 are caused to drop a relatively short distance when each of them is fed from the cartridge 20A and positioned in the receiving tool 41. Accordingly, large impacts are not expected on the filters 6, thus preventing the filters 6 from being damaged.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A feeder device for automatically feeding filters one by one to casting molds, said device comprising:

at least one vertically arranged cartridge to accommodate therein a plurality of filters placed one upon another;

filter discharge means, disposed at a lower end of said cartridge, for discharging a lowermost filter of the filters accommodated in said cartridge, said filter discharge means comprising shutter means pivotally mounted on said lower end of said cartridge and pivotable between a closed position whereat the lowermost filter is retained in said cartridge and an open position whereat the lowermost filter is discharged from said filter discharge means;

receiving means for receiving the filter discharged from said filter discharge means at a first location below said cartridge, said receiving means being mounted for pivotal movement between said first location and a second location from which the filter discharged from said filter discharge means is transferred towards one of the casting molds;

said receiving means including means for pivoting said shutter means to said open position thereof upon pivotal movement of said receiving means from said second location to said first location; and said receiving means having therein a first recess for receiving the filter discharged from said filter discharge means when said receiving means is at said first location and a second recess, and said first and second recesses having a construction such that as said receiving means pivots from said first location to said second location the filter moves from said first recess to said second recess.

2. A feeder device as claimed in claim 1, further comprising clamp means for clamping at said second location the filter received by said receiving means so that the thus clamped filter then may be transferred towards the casting mold.

3. A feeder device as claimed in claim 2, further comprising means for, after said clamp means has clamped the filter at said second location, moving said clamp means to a third location whereat the filter may be placed in the casting mold.

4. A feeder device as claimed in claim 1, further comprising detector means for detecting whether or not the filter discharged from said filter discharge means must be placed in the casting mold.

5. A feeder device for automatically feeding filters one by one to casting molds, said device comprising:
a rotatably arranged table;
a plurality of cartridges each to accommodate therein a plurality of filters placed one upon another, said cartridges being vertically arranged on said table;
filter discharge means, disposed at a lower end of each said cartridge, for when said cartridge is at a predetermined position, discharging a lowermost filter of the filters accommodated in said cartridge, said filter discharge means comprising shutter means pivotally mounted on said lower end of said cartridge and pivotable between a closed position whereat the lowermost filter is retained in said cartridge and an open position whereat the lowermost filter is discharged from said filter discharge means;

receiving means for receiving the filter discharged from said filter discharge means at a first location below said cartridge, said receiving means being mounted for pivotal movement between said first location and a second location from which the filter discharged from said filter discharge means is transferred towards one of the casting molds;

said receiving means including means for pivoting said shutter means to said open position thereof upon pivotal movement of said receiving means from said second location to said first location; and said receiving means having therein a first recess for receiving the filter discharged from said filter discharge means when said receiving means is at said first location and a second recess, and said first and second recesses having a construction such that as said receiving means pivots from said first location to said second location the filter moves from said first recess to said second recess.

6. A feeder device as claimed in claim 5, further comprising clamp means for clamping at said second location the filter received by said receiving means so that the thus clamped filter then may be transferred towards the casting mold.

7. A feeder device as claimed in claim 6, further comprising means for, after said clamp means has clamped the filter at said second location, moving said clamp means to a third location whereat the filter may be placed in the casting mold.

8. A feeder device as claimed in claim 5, further comprising detector means for detecting whether or not the filter discharged from said filter discharge means must be placed in the casting mold.

* * * * *